Patented Nov. 22, 1949

2,488,690

UNITED STATES PATENT OFFICE 2,488,690

DIAZOAMINOBENZENE - PHENOLIC COMPOUND CATALYST COMBINATIONS IN BUTADIENE-STYRENE EMULSION POLYMERIZATION

William N. Stoops, Charleston, W. Va., assignor to Carbide and Carbon Chemicals Corporation, a corporation of New York No Drawing. Application March 12, 1947,
Serial No. 734,224

6 Claims. (Cl. 260—84.7)

This invention relates to the polymerization of unsaturated hydrocarbons, wherein the rate of polymerization is accelerated by the use of a particular catalyst combination. It is well known that conjugated diolefines may be polymerized to form elastomers in the presence of oxygen-yielding compounds, such as hydrogen peroxide, benzoyl peroxide, potassium persulfate, and sodium perborate. Synthetic rubber is also produced by the copolymerization of butadiene and styrene according to these general methods. However, the rate of polymerization in the presence of the known catalysts is relatively slow.

It has now been found that conjugated diolefines as well as styrene may be polymerized at rates several times as fast as that obtainable with a peroxidic catalyst by employing a catalyst combination composed of diazoaminobenzene and an activating compound of the group consisting of hydroquinone, monochlorohydroquinone, p-quinone, pyrogallol, quinhydrone, dichlorohydroquinone and catechol. This catalyst combination is specific in its action as it has effectively catalyzed polymerization of all conjugated diolefines tested including butadiene, isoprene, 2-ethyl-butadiene, 2,3-dimethyl-butadiene, piperylene and 2-methyl-pentadiene. It is not an effective catalyst for the polymerization of certain substituted diolefines, such as 1-acetoxy-butadiene, 1-cyano-butadiene and chloroprene. The catalyst combination promotes the polymerization of styrene, but it does not catalyze the polymerization of vinyl chloride, vinyl acetate, acrylonitrile, or vinyl ketones. It catalyzes the copolymerization of diolefines with styrene, but it is not an active initiator for the copolymerization of butadiene and isoprene with acrylonitrile or vinyl ketones.

Experience has further indicated that the catalyst combination of this invention is effective only when the monomers to be polymerized are emulsified in water. Although diazoaminobenzene is a known catalyst for the polymerization of conjugated diolefines, the addition of one of the designated phenols or phenolic derivatives to diazoaminobenzene creates a catalyst combination which is far more effective than diazoaminobenzene alone. Furthermore, comparative tests have established that no other reducing agent tested is as effective as one of the designated phenols or phenolic derivatives in promoting the polymerizing activity of diazoaminobenzene. Of the designated phenols and phenolic derivatives hydroquinone is by far the more effective, so that the combination of diazoaminobenzene and hydroquinone may be regarded as unique in its action. Comparative data on which these statements are based are given below:

One part of isoprene, 2 parts of a 5% aqueous sodium oleate solution and 1.0% of diazoaminobenzene were agitated for 19 hours at 40° C. The conversion of isoprene monomer to polymer was 24%, indicating a rate of polymerization of 1.3% monomer polymerized per hour. Identical results were obtained when the experiment was repeated using the same amount of potassium persulfate in place of diazoaminobenzene as the catalyst. A series of experiments were then carried out in which one part of isoprene, 2 parts of a 5% sodium oleate solution, 1.0% of diazoaminobenzene and 0.5% of each of the compounds listed below, both based on the isoprene, were agitated for only 2 hours at 40° C. The results are tabulated below:

| Added Compound | Per cent Monomer Polymerized | Approximate Rate of Polymerization— Per cent Monomer Polymerized per Hour |
|---|---|---|
| Hydroquinone | 35 | 18 |
| Monochlorohydroquinone | 22 | 11 |
| p-Quinone | 15 | 8 |
| Pyrogallol | 15 | 8 |
| Quinhydrone | 14 | 8 |
| Dichlorohydroquinone | 12 | 6 |
| Catechol | 10 | 5 |
| p-Aminophenol hydrochloride | 0 | 0 |
| Resorcinol | 0 | 0 |
| Anthraquinone | 0 | 0 |
| Glycine | 0 | 0 |
| Diaminophenol | 0 | 0 |
| Monomethyl p-amino-phenol sulfate | 0 | 0 |
| Sodium sulfite | 0 | 0 |

The amount of diazoaminobenzene employed is quite small with reference to the amount of monomer present, and in general, from 0.2 to 3% of the diazo compound based on the monomer or monomers may be employed, but these amounts are not critical. Likewise, the amount of the designated phenols and quinones associated with diazoaminobenzene is not critical and may be varied from about 25% to 200% of the amount of diazoaminobenzene present. When the diazoaminobenzene is associated with an effective amount of the designated phenols and quinones the rate of polymerization may be increased by increasing the concentration of diazoaminobenzene in the polymerization mixture as long as an effective amount of one of the designated promoters is present. In other words, a combination of two parts of diazoaminobenzene and one part of the promoter to 100 parts of monomer will give a faster rate of polymerization than a combination of one part of diazoaminobenzene and one part of promoter to 100 parts of monomer.

The rate of polymerization is also a direct function of the temperature. Thus, the new catalyst combination may be used to catalyze polymerization at lower temperatures and thus to effect the same rates of polymerization which are obtained with the usual peroxidic catalysts at higher temperatures. The use of lower temperatures in the polymerization is found beneficial as it permits the production of elastomers having higher molecular weights and less cross-linking in their structure.

So far as my experience indicates, the catalyst combination of diazoaminobenzene and hydroquinone or one of the related promoters is singular in its action as the addition of hydroquinone to other polymerization catalysts or other vulcanizing agents for rubber which do not contain sulphur results in ineffective combinations or in combinations which are far less effective than the combination of this invention. In carrying out these tests butadiene and styrene, in the weight ratio of 2 to 1 were emulsified in a soap solution in the weight ratio of one part of the mixed monomers to two parts of the soap solution. The soap solution was a 10% by weight dispersion of sodium oleate, and each sample contained 1% on the monomer of the compound to be tested and 0.5% on the monomer of hydroquinone. Each sample was continuously agitated for 4 hours at 40° C. At the end of this time the degree of conversion of monomers to polymer was determined. The results are tabulated below:

| Added Compound | Per Cent Monomers Polymerized | Rate of Polymerization—Per Cent Monomers Polymerized per Hour |
|---|---|---|
| Diazoaminobenzene | 53 | 13 |
| Dichlorodiazoaminobenzene | 28 | 7 |
| Diazoaminonaphthaline | 0 | 0 |
| 2,2'Dinitrodiazoaminobenzene | 0 | 0 |
| Azobenzene | 0 | 0 |
| Hydrazobenzene | 0 | 0 |
| Benzoyl peroxide | 0 | 0 |
| Potassium persulfate | 12 | 3 |
| Potassium persulfate (1.0%) (No Hydroquinone) | 12 | 3 |
| Dimethyl aniline | 18 | 5 |
| Nitroguanidine | 18 | 5 |
| p-Nitrosodimethyl aniline | 0 | 0 |
| N-nitrosoacetanilide | 0 | 0 |
| p-Phenylene diamine | 0 | 0 |
| Diorthotolyl guanidine | 0 | 0 |
| m-Dinitro benzene | 0 | 0 |
| Chloranil | 0 | 0 |
| Tetraphenyl hydrazine | 0 | 0 |

The usual modifiers employed in diolefine polymerization, such as mercaptans, phenyl hydrazine, carbon tetrachloride and the like, may be used with the present catalyst combination and they produce substantially the same results i. e. softening of the elastomers, as they do when employed with the peroxidic catalysts. Anti-oxidants such as phenyl-beta-naphthylamine may be included in the monomer emulsion without appreciably lowering the rate of polymerization. Furthermore, the addition of the antioxidant at this stage, rather than at the end of the polymerization, as now practiced, has several advantages. For instance, the ultimate dispersion of the antioxidant in the elastomer is improved, and the charge is protected from oxidation at all times.

The following examples will further illustrate the invention:

Example 1

An emulsion containing by weight 33% butadiene, 67% of a 5% solution of sodium oleate, 0.5% diazoaminobenzene and 0.5% pyrogallol (both on the monomer) was agitated for 21 hours at 50° C. and a 65% yield of polymer was obtained. A similar charge containing 0.5% potassium persulfate as the sole catalyst showed 45% conversion after heating for 22 hours at 50° C.

Example 2

An emulsion containing by weight 20% styrene, 80% of a 2.5% solution of sodium oleate, 1.0% diazoaminobenzene and 0.5% hydroquinone (both on the styrene) was agitated for one hour at 60° C. Polystyrene was obtained in 88% yield. A similar charge containing 1.0% potassium persulfate as the sole catalyst showed 60% conversion to polymer after heating for one hour at 60° C.

Example 3

An emulsion containing by weight 33% of 2-methyl-pentadiene, 67% of a 5% solution of sodium oleate, 1.0% of diazoaminobenzene and 0.5% of hydroquinone (both on the monomer) was polymerized to 22% conversion after heating for seven hours at 40° C. A similar charge containing 1.0% potassium persulfate instead of the diazoaminobenzene and hydroquinone showed less than 3% conversion to polymer after heating for 19 hours at 40° C.

Example 4

An emulsion containing by weight 3 parts of a 6.7% solution of sodium oleate, 1 part of a monomer mixture made up of 75% 2-ethylbutadiene and 25% styrene, 0.5% diazoaminobenzene and 0.2% hydroquinone (both on the monomer mixture) was agitated at 40° C. for 20 hours. Polymerization to the extent of 85% was obtained. A corresponding charge containing 1.0% potassium persulfate as the sole catalyst polymerized to 26% conversion in 20 hours and to 75% conversion in 66 hours.

Example 5

An emulsion containing by weight 33% of a monomer mixture (70% butadiene, 30% styrene), 67% of a 1.5% solution of sodium oleate, 0.3% diazoaminobenzene and 0.1% hydroquinone (both on the monomer mixture) was agitated in a stainless steel vessel for 20.5 hours at 35° C. Polymer corresponding to 69% conversion was obtained.

Example 6

The charge and polymerization conditions were identical with those of Example 5, except that 0.6% lauryl mercaptan (on the monomer mixture) was added. Polymer corresponding to 66% conversion was obtained.

Example 7

The charge and polymerization conditions were identical with those of Example 5, except that 1.0% phenyl-beta-naphthylamine (on the monomer mixture) was added. Polymer corresponding to 63% conversion was obtained.

Example 8

The three polymers prepared in Examples 5, 6 and 7 were compounded on a differential roll mill according to the following formula:

| | Parts by weight |
|---|---|
| Elastomer | 100 |
| Carbon black | 50 |
| Zinc oxide | 5 |
| Stearic acid | 3 |
| Phenyl-beta-naphthylamine | 1 |
| Sulfur | 2 |
| Benzothiazyl disulfide | 1 |
| Butyraldehyde-aniline accelerator | 0.75 |

After compounding these stocks on a rubber mill, the following plasticity values were determined:

| | Composition | | |
|---|---|---|---|
| | Example 5 | Example 6 | Example 7 |
| Plasticity, Defo units | 4050-71 | 625-42 | 4100-72 |

After vulcanizing the milled stocks at 140° C., the following physical properties were determined.

| | Composition | | |
|---|---|---|---|
| | Example 5 | Example 6 | Example 7 |
| Tensile strength, p. s. i | 4,075 | 3,060 | 4,100 |
| Elongation at break, percent | 500 | 730 | 525 |
| Modulus at 300% elongation, p. s. i. | 1,600 | 575 | 1,400 |
| Shore hardness (Scale A) | 69 | 61 | 67 |

I claim:

1. The process of polymerizing in aqueous emulsion unsaturated hydrocarbons of the group consisting of styrene, conjugated diolefines, and mixtures of styrene with said conjugated diolefines in the presence of a small amount of a catalyst combination composed of diazoaminobenzene mixed with an activating compound of the group consisting of hydroquinone, monochlorohydroquinone, p-quinone, pyrogallol, quinhydrone, dichlorohydroquinone and catechol.

2. The process of polymerizing in aqueous emulsion unsaturated hydrocarbons of the group consisting of styrene, conjugated diolefines, and mixtures of styrene with said conjugated diolefines in the presence of a catalyst combination composed of diazoaminobenzene mixed with an activating compound of the group consisting of hydroquinone, monochlorohydroquinone p-quinone, pyrogallol, quinhydrone, dichlorohydroquinone and catechol, the amount of diazoaminobenzene in the catalyst combination being 0.2 to 3% of the unsaturated hydrocarbon content of the emulsion and the amount of said activating compound being 25% to 200% of the diazoaminobenzene.

3. The process of polymerizing in aqueous emulsion a conjugated diolefine containing from four to six carbon atoms in the presence of a small amount of a catalyst combination composed of diazoaminobenzene mixed with hydroquinone as an activator.

4. The process of polymerizing butadiene in aqueous emulsion in the presence of a small amount of a catalyst combination composed of diazoaminobenzene mixed with hydroquinone as an activator.

5. The process of copolymerizing in aqueous emulsion a mixture of butadiene and styrene in the presence of a small amount of a catalyst combination composed of diazoaminobenzene mixed with hydroquinone as an activator.

6. The process of polymerizing styrene in aqueous emulsion in the presence of a small amount of a catalyst combination composed of diazoaminobenzene mixed with hydroquinone as an activator.

WILLIAM N. STOOPS.

REFERENCES CITED

The following references are of record in the file of this patent:

UNITED STATES PATENTS

| Number | Name | Date |
|---|---|---|
| 1,550,324 | Ostromislensky | Aug. 18, 1925 |
| 2,180,082 | Cunradi | Nov. 14, 1939 |
| 2,313,233 | Fryling | Mar. 9, 1943 |